United States Patent [19]

Lang

[11] 3,980,406

[45] Sept. 14, 1976

[54] DUPLEX IMAGING SYSTEM

[75] Inventor: Richard F. Lang, Fairport, N.Y.

[73] Assignee: Xerox Corporation, Stamford, Conn.

[22] Filed: June 2, 1975

[21] Appl. No.: 582,580

[52] U.S. Cl. .................... 355/24; 355/8; 355/11

[51] Int. Cl.² .................... G03B 27/32; G03B 27/52

[58] Field of Search .................... 355/23, 24, 8, 11, 14

[56] References Cited

UNITED STATES PATENTS

| | | | |
|---|---|---|---|
| 3,227,444 | 1/1966 | Egan | 355/23 X |
| 3,844,653 | 10/1974 | Kelly | 355/8 |

*Primary Examiner*—Richard A. Wintercorn
*Attorney, Agent, or Firm*—Sheldon F. Raizes

[57] ABSTRACT

A duplex copying machine is provided wherein an original document, having images on both sides, is located between a transparent rotatable drum and conveyor belts and is automatically transported thereby to a first image station to expose to a photoconductor, by lamps external to the drum, the side of the document engaged by the conveyor belts. Thereafter, the document is automatically transported to a second image station to expose to the photoconductor, by lamps surrounded by the drum, the side of the document engaged by the drum.

11 Claims, 3 Drawing Figures

DUPLEX IMAGING SYSTEM

DESCRIPTION OF THE INVENTION

It is an object of this invention to provide a copying machine capable of duplex copying where an original document, having images on both sides, is automatically transported to separate imaging stations for imaging a respective side of the document to a recording medium.

It is a further object of the invention to construct the transport mechanism in such a manner that there is essentially no relative movement between the original document and the transport mechanism engaging the original document to prevent static buildup between the document and the transport mechanism and possible smearing or smudging of the original document.

Other objects of the invention will become apparent from the following description with reference to the drawings wherein.

Figure 1:
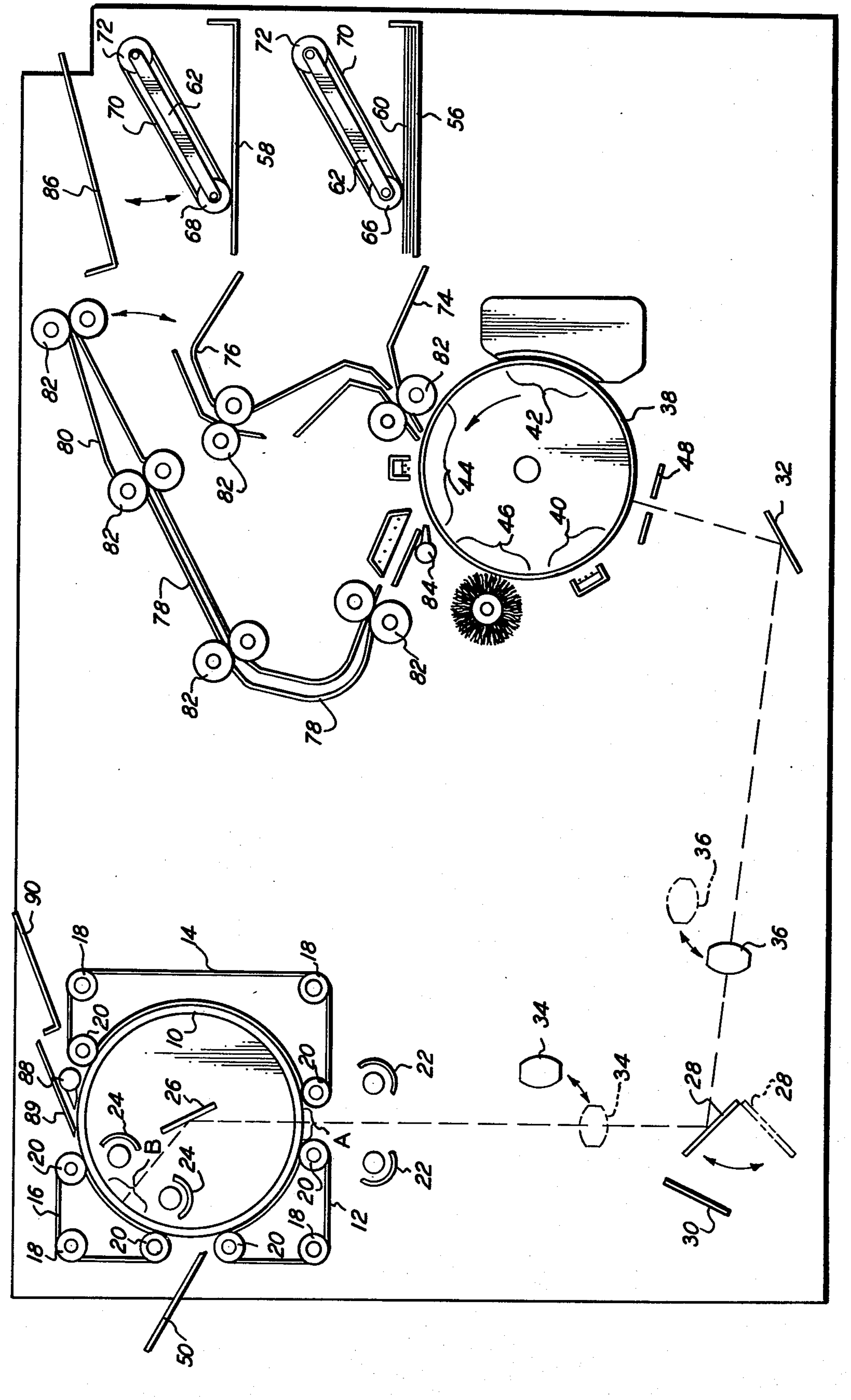
FIG. 1 is a schematic side view of a duplex copying machine.

Referring to FIG. 1, a copier is illustrated which comprises a transparent quartz rotatable cylindrical transport drum 10 surrounded by three separate drive belts 12, 14 and 16. Each belt is wrapped around driving pulleys 18 and idler pulleys 20 and contacts the drum 10 under a stressed condition to rotate the drum at the same speed that the belts are driven. The driving pulleys 18 are interconnected to a reversible motor which drives the pulleys in reverse directions to rotate the belts in opposite directions and thereby rotate the drum in opposite directions.

A pair of stationary lamps 22 is located outside the drum-belt assembly and is arranged to illuminate an image station A corresponding to the space between the belts 12 and 14. A pair of stationary lamps 24 is surrounded by the drum 10 and is disposed to illuminate an image station B corresponding to a portion of the contact area between the belt 16 and the drum 10. A stationary mirror 26 is also located within the confines of the drum 10 and is arranged to reflect rays from the image station B through the drum 10 at the image station A.

A shiftable mirror 28, a pair of stationary mirrors 30 and 32 and a pair of imaging lenses 34 and 36 are located between the drum 10 and a selenium coated photoconductor drum 38 for directing an image from either image station A or B to the photoconductor 38, which rotates in a counterclockwise direction. Mirror 28 is shiftable between an image station A position, where it directs light rays from image station A to mirror 32, and an image station B position, where it directs light rays from image station B to mirror 30. Lens 34 is shiftable between an imaging position in which it is in the path of rays reflected from image station B to the photoconductor 38 and an inoperative position which is out of such path. Lens 36 is shiftable between an imaging position in which it is in the path of rays reflected from image station A to the photoconductor 38 and an inoperative position which is out of such path. Arranged around the photoconductor 38 is a charging station 40, a development station 42, an image transfer and fusing station 44 and a drum cleaning station 46, the function of each of which is well known in the xerographic copying art. A mask 48 is provided between the mirror 32 and the photoconductor drum 38 to block out extraneous light rays from the photoconductor drum and thus provide slit imaging thereat.

Figure 2:
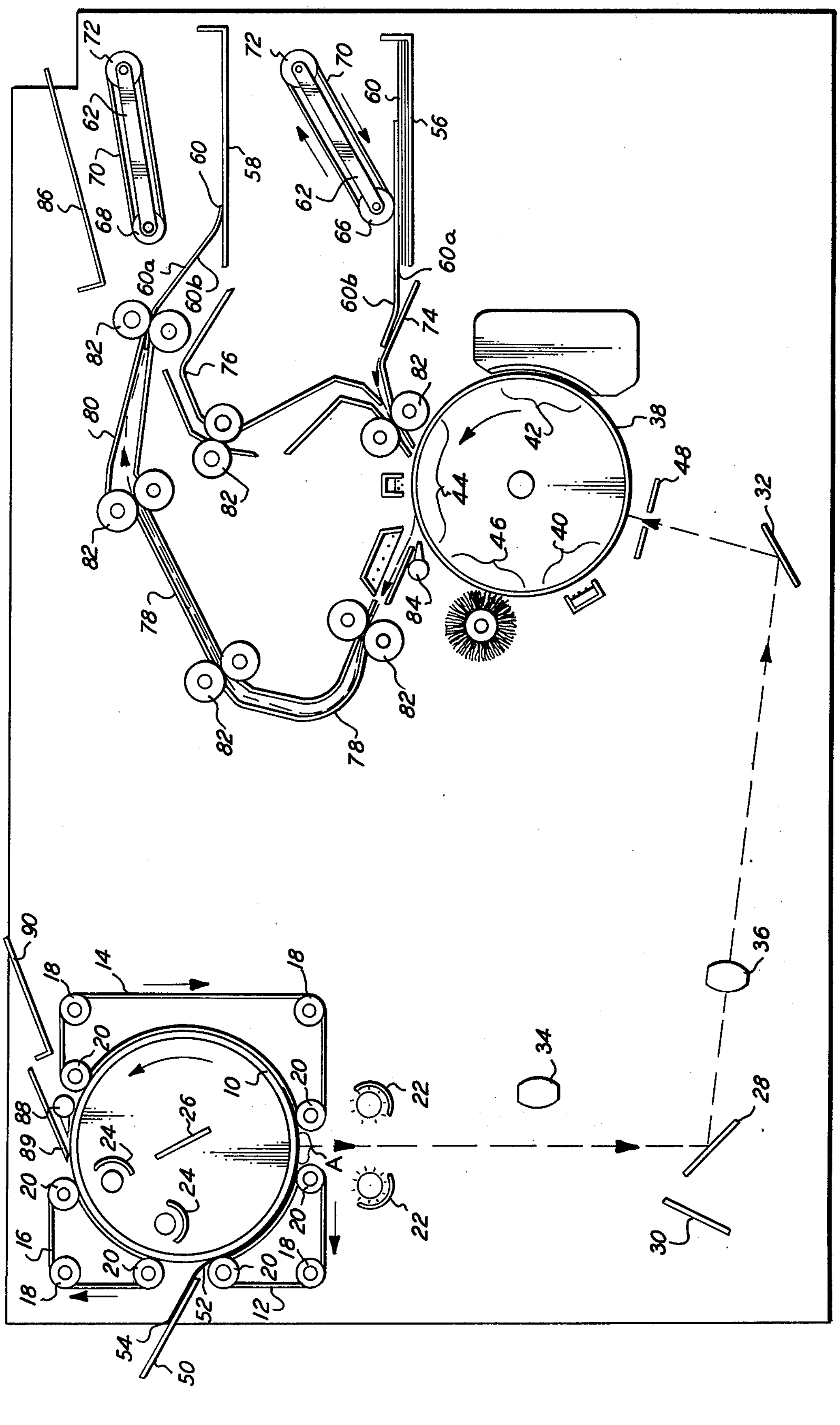
FIG. 2 is a schematic side view of the duplex copying machine in a "side one" copying mode.
Figure 3:
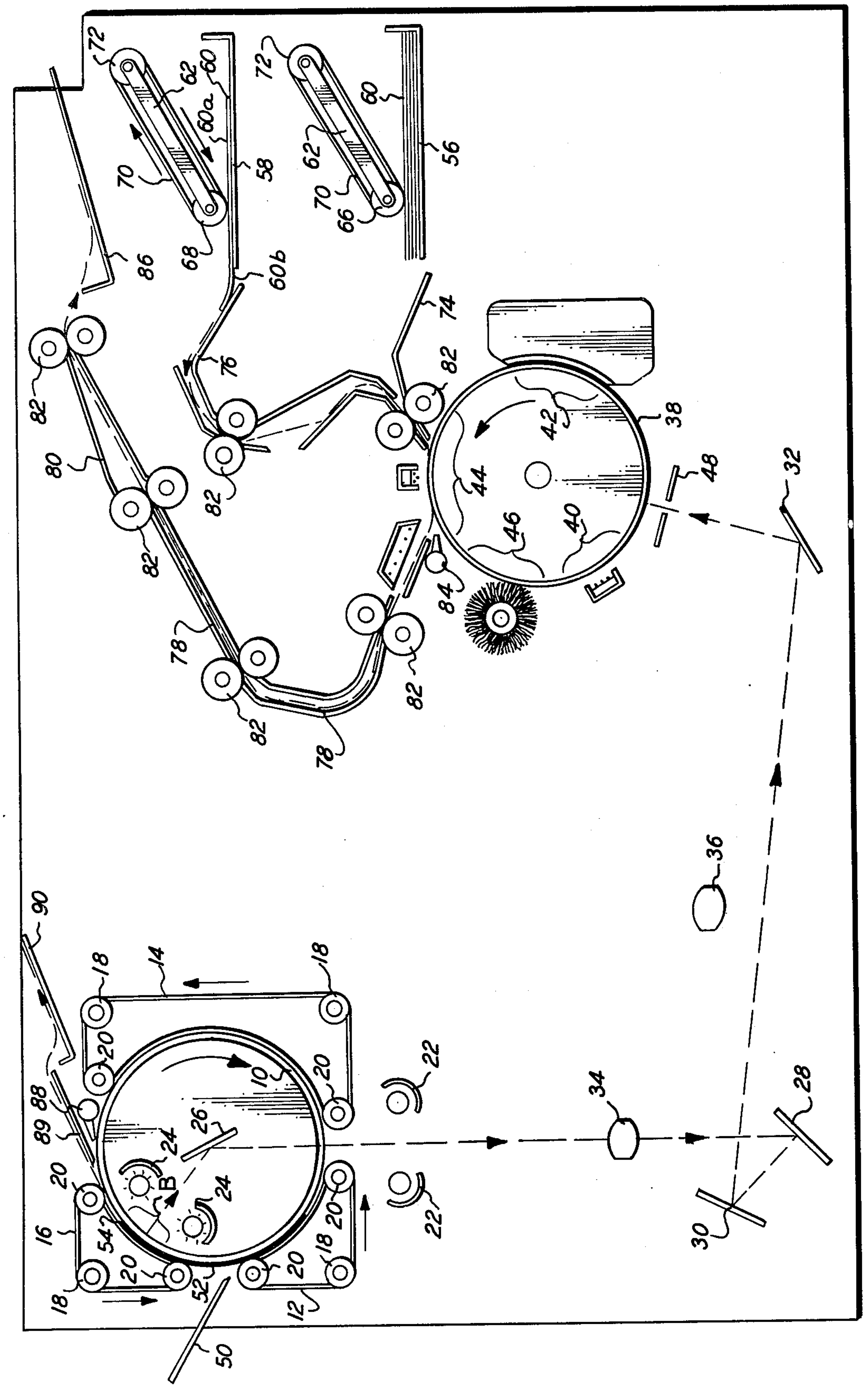
FIG. 3 is a schematic side view of the duplex copying machine in a "side two" copying mode.

An original document input tray 50 is so arranged to guide an original document 52 into the nip formed between the belt 12 and the drum 10. With the drum rotating in a counterclockwise direction (FIG. 2), the original document 52 will be brought past the image station A. Mirror 28 is positioned at an image station A position which directs the light rays reflected from the document 52 to mirror 32. Lens 36 is positioned at its imaging position in the path of the rays reflected from mirror 28 to mirror 32 to focus the image carried by the document 52 onto the photoconductor 38. Lens 34 is in its inoperative position out of the ray path and mirror 30 is not utilized in the optical path when the document 52 is imaged at image station A. After the trailing edge 54 of the document has passed through the image station A, the belts are stopped and then reversed to effect reverse rotation of the drum 10 and reverse movement of the document 54 to move the document past the image station B (FIG. 3). Also, mirror 28 is moved to its image station B position, lens 34 is moved from its inoperative position to its imaging position in the optical path of rays reflected by the mirror 26 to the mirror 28, and lens 36 is moved out of the optical path into its inoperative position. At the appropriate time, lamps 22 or 24 are actuated to illuminate their respective image stations for illuminating the document for imaging to the photoconductor 38.

A primary tray 56 and a secondary tray 58 are provided for holding a supply of copy sheets 60 and one or more copy sheets 60 having had an image transferred from the photoconductor 38 to one side thereof, respectively. Sheet actuator arms 62 and 64 are provided for each tray and have a plurality of rollers 66 and 68 rotatably mounted thereon which are interconnected to drive gears 72 by serrated belts 70 which are coupled to a drive motor (not shown). The interconnection is such that the rollers 66 and 68 will be driven in a clockwise direction to discharge a sheet from a respective tray. A mechanism (not shown) is provided for lifting the arm 64 from the tray 58 to allow entry of a copy sheet 60 onto the tray 58.

A copy transport comprises a primary guide 74, arranged to receive copy sheets 60 from the primary tray 56, and a secondary guide 76, arranged to receive copy sheets 60 from secondary tray 58. Each of these guides leads the copy sheet 60 to the image transfer station and fuser station 44. A plurality of intermediate guide sections 78 lead the copy sheet 60 from the transfer and fuser station to a swingable end guide portion 80. A plurality of rotating nip rolls 82 are provided along the transport path to move the copy paper therethrough. A puffer unit 84 is located adjacent the photoconductor drum 38 to emit jets of air to dislodge the sheet 60 from the drum 38. The guide section 80 is movable from a final copy output position, as shown in FIGS. 1 and 3, where a copy sheet passing therethrough is discharged to an output tray 86, to an intermediate copy output position, as shown in FIG. 2, where a copy sheet passing therethrough is discharged to the secondary tray 58. The primary and secondary tray arrangement and the copy paper transport is a well-known mechanism which is incorporated in a commercial copying machine marketed by the Xerox Corporation as the Xerox 4000.

A puffer unit 88 is located in the space between the belts 14 and 16 and is arranged to emit jets of air to dislodge the leading edge of and thereby the original document 52 from the drum 10 when the drum and document are moving in a clockwise direction. A guide plate 89 is provided to guide the original document 52 into an original document receiving tray 90 after it is dislodged from the drum by puffer 88 as shown in FIG. 3.

Well-known mechanisms and circuitry can be provided to cause the lamps 24 and 22 to be activated at the proper time; to rotate the belts 12, 14 and 16 in the proper direction at the proper time; to move lenses 34, 36 and mirror 28 to their proper positions at the proper time; to cause the rolls 66 to discharge the copy sheet 60 from tray 56, pivot the guide section 80 to its intermediate output position and lift arm 64 at the proper time; actuate the rolls 68 to discharge the copy sheet 60 from tray 58 and move the guide section 80 back to its final output position at the proper time; perform the image development and developed image transfer and fusing functions at the proper time; and actuate the puffer 88 at the proper time; all in accordance with the following mode of operation.

Referring to FIG. 2, the document 52, containing an original image thereon, is fed onto the tray 50 and into the nip formed between the belt 12 and the drum 10 which are actuated to rotate in a counterclockwise direction. Lights 22 are actuated to illuminate one side of the document 52 as it passes through station A. Mirror 28 is in its image station A position, lens 36 is in its imaging position and lens 34 is in its inoperative position. The illuminated image on the document 52 is directed through the lens 36 by the mirror 28 to the mirror 32 and directed thereby through the slit image mask 48 to the photoconductor 38 to create a latent image thereon. The image on document 52 is focused by the lens 36 onto a depth of field which includes the surface of the photoconductor 38.

Referring to FIG. 3, as soon as the trailing edge 54 of the document 52 passes through station A, lamps 22 are turned off, the rotation of the belts 12, 14 and 16 is reversed to rotate the drum 10 and reverse the movement of the document 50, lamps 24 are actuated, lens 34 is moved to its imaging position, mirror 28 is moved to its image station B position and lens 36 is moved to its inoperative position. The former trailing edge 54 of the document 52 now becomes the leading edge thereof and the opposite or second side of the document is illuminated by lamps 24 as it passes through the image station B. The image on the second side of the document is directed by mirror 26 through lens 34 to the mirror 28 which reflects the same to mirror 30. Mirror 30 reflects the image to mirror 32 which directs the same through the slit image mask 48 to the photoconductor 38 to create a second latent image thereon. The image on the second side of document 52 is focused by the lens 34 onto a depth of field which is on the surface of the photoconductor 38. The puffer 88 is actuated to break contact between the edge 54 of the document 52 and the drum 10 whereby the document 52 will ride up the guide plate 89 into the tray 90. Thereafter, the conveyor belts 12, 14 and 16 are stopped, the lamps 24 turned off, lens 34 moved back to its inoperative position, mirror 28 moved to its image station A position and lens 36 moved to its imaging position whereby the image mechanism is ready to make the next copy.

Referring back to FIG. 2, as the first image on the first side of the document 52 is being imaged to the photoconductor drum 38, the roll 66 is actuated to discharge copy sheet 60 from the tray 56 onto the guide 74 and the nip rolls 82 bring the same past the transfer and fuser station 44 whereby the developed image is transferred to the side **60*a* of sheet 60. At the same time, the arm 64 is lifted from tray 58 and end guide section 80 is pivoted to its intermediate discharge position to direct the sheet 60 into the tray 58. Thereafter section 80 is moved back to its final output position and the arm 64 is pivoted to bring the rolls 68 into contact with the side 60*b* of sheet 60. Referring again to FIG. 3, when the belts 12, 14 and 16 reverse rotation for effecting imaging of the second side of document 52, the roll 68 is also actuated to discharge the sheet 60 from tray 58 into the guide 76 and the nip rolls 82 bring the sheet through the transfer and fusing station 44 whereby the developed second image on photoconductor 38 is transferred to the second side 60*b* of the sheet 60. The copy sheet 60 is then discharged onto tray 86.**

It should be noted that the drum 10, conveyor belt 12, 14 and 16 arrangement permits an original document to be transported without any substantial relative movement between the drum and belts thereby eliminating possible smudging and static buildup.

The circuitry and the mechanisms for operating the various elements described can also be so designed to allow copying of an image on only one side of original document 52 whereby the image is illuminated at image station A, the sheet 60 bypasses tray 58 and is directed to tray 86 after image transfer thereto, the document 52 is reversed through image station B while maintaining the lamps 24 inoperative and the document is discharged to tray 90. Also, multiple duplex copies may be made by continuing rotation of the belts 12, 14 and 16 and thereby the document 52 in one direction, and transmitting the image on one side of the document to the drum 38 each time it passes through image station A. Sheets 60 would be fed to tray 58 after receiving a developed image on one side. Thereafter the belts 12, 14 and 16 are reversed to bring the document 52 repeatedly past image station B for transmission of the image on the other side of the document 52 to the photoconductor 38. Sheets 60 would be fed from tray 58 for transfer of the second image thereto. After the last image is formed, the puffer 88 would be actuated to discharge document 52 from the drum 10 onto the tray 90.

What is claimed is:

1. In a duplex copying machine: a transparent rotatable drum, conveyor means engaging the outer surface of said drum, first illumination means located exterior of said drum and arranged to direct light rays along a first given path intersecting a given area through which said drum rotates to define a first image station, second illumination means located within the confines of said drum and arranged to direct light rays along a second given path intersecting a given area through which said drum rotates to define a second image station, a recording medium, means for moving said conveyor means and rotating said drum at substantially the same speed and in the same direction, means for introducing a document with an image on each side thereof between said conveyor means and said drum and engaging the same, said drum and conveyor means moving said document through one of said image stations whereby an image on one side of said document is illuminated by a respective one of said illumination means, means for reversing movement of said conveyor means and rotation of said drum to thereby reverse movement of said document, said conveyor means and drum moving said document in the reverse direction through the other of said image stations whereby the image on the other side of said document is illuminated by the other of said illumination means, and means for imaging the illuminated images at said first and second image stations to said recording medium.

2. The structure as recited in claim 1 wherein said means for imaging the illuminated image at said second station to said recording medium includes a mirror located within the confines of said drum and arranged to reflect the illuminated image at said second station through said drum at the location of said first station.

3. The structure as recited in claim 1 wherein said imaging means includes lens means and mirror means located between said first image station and said recording medium.

4. The structure as recited in claim 3 wherein said imaging means further includes a mirror located within the confines of said drum and arranged to reflect the illuminated image at said second station through said drum at the location of said first station to at least a portion of said lens means and to at least a portion of said mirror means.

5. The structure as recited in claim 3 wherein said lens means comprises two lenses movable between an imaging position to image a respective one of the illuminated images at a respective one of said image stations to said recording medium and an inoperative position, one of said lenses being in its imaging position while the other of said lenses is at its inoperative position, said mirror means including a mirror movable between a first image station position and a second image station position for changing the length of the optical path between said image stations and said recording medium to effect the required optical conjugate for the particular lens which is in its imaging position at a given time.

6. The structure as recited in claim 1 further comprising: means for developing the image on said recording medium means for transferring the developed image to a copy medium, a primary tray for receiving at least one copy medium thereon, a secondary tray, a finished copy tray, first guide means leading from said primary tray to said recording medium, second guide means leading from said secondary tray to said recording medium, third guide means leading from said recording means, fourth guide means leading from said third guide means, means for selectively moving said fourth guide means to direct the copy medium to either said secondary tray or said finished copy tray, means for moving a copy medium from said primary tray into said first guide means past said recording medium to said third and fourth guide means to said secondary tray to receive a developed image on one side thereof from said recording medium, said developed image being the image from said one image station, means for moving the copy medium from said secondary tray into said second guide means past said recording medium to said third and fourth guide means to said finished copy tray to receive a developed image on the other side thereof from said recording medium, said last named developed image being the image from said other image station.

7. In a duplex copying machine: a transparent rotatable drum, conveyor means engaging the outer surface of said drum, first ilumination means located exterior of said drum and arranged to direct light rays along a first given path intersecting a given area through which said drum rotates to define a first image station, second illumination means located within the confines of said drum and arranged to direct light rays along a second given path intersecting a given area through which said drum rotates to define a second image station, a recording medium, means for moving said conveyor means and rotating said drum at substantially the same speed and in the same direction, means for guiding a document with an image on each side thereof between said conveyor means and said drum, means for reversing movement of said conveyor means and rotation of said drum, and means for imaging said first and second image stations to said recording medium.

8. The structure as recited in claim 7 wherein said means for imaging said second station to said recording medium includes a mirror located within the confines of said drum and arranged to reflect said second station through said drum at the location of said first station.

9. The structure as recited in claim 7 wherein said imaging means includes lens means and mirror means located between said first image station and said recording medium.

10. The structure as recited in claim 9 wherein said imaging means further includes a mirror located within the confines of said drum and arranged to reflect said second station through said drum at the location of said first station to at least a portion of said lens means and at least a portion of said mirror means.

11. The structure as recited in claim 9 wherein said lens means comprises two lenses movable between an imaging position to image a respective one of said image stations to said recording medium and an inoperative position, one of said lenses being in its imaging position while the other of said lenses is at its inoperative position, said mirror means including a mirror movable between a first image station position and a second image station position for changing the length of the optical path between said image stations and said recording medium to effect the required optical conjugate for the particular lens which is in its imaging position at a given time.

* * * * *

UNITED STATES PATENT AND TRADEMARK OFFICE
CERTIFICATE OF CORRECTION

PATENT NO. : 3,980,406

DATED : September 14, 1976

INVENTOR(S) : Richard F. Lang

It is certified that error appears in the above-identified patent and that said Letters Patent are hereby corrected as shown below:

Column 5, line 46, insert --,-- (comma) after "medium".

Column 6, line 14, "ilumination" should read --illumination--.

Signed and Sealed this

Twelfth Day of April 1977

[SEAL]

*Attest:*

RUTH C. MASON
*Attesting Officer*

C. MARSHALL DANN
*Commissioner of Patents and Trademarks*